United States Patent [19]

Moegel

[11] Patent Number: 5,300,202
[45] Date of Patent: Apr. 5, 1994

[54] PROCESS AND DEVICE FOR DISPOSING OF ORGANIC VAPORS, IN PARTICULAR SOLVENT VAPORS

[76] Inventor: Helmut Moegel, Eduard-Pfeiffer-Strasse 30, W-7000 Stuttgart, Fed. Rep. of Germany

[21] Appl. No.: 835,463
[22] PCT Filed: Aug. 24, 1990
[86] PCT No.: PCT/EP90/01417
§ 371 Date: Feb. 25, 1992
§ 102(e) Date: Feb. 25, 1992
[87] PCT Pub. No.: WO91/02580
PCT Pub. Date: Mar. 7, 1991

[30] Foreign Application Priority Data

Aug. 26, 1989 [DE] Fed. Rep. of Germany ....... 3928293
Sep. 6, 1989 [DE] Fed. Rep. of Germany ....... 3929542

[51] Int. Cl.$^5$ ................................................ B01D 53/00
[52] U.S. Cl. ................................ 204/157.3; 588/200; 588/219; 588/227; 588/243; 422/186; 422/186.21; 422/186.25; 422/186.29
[58] Field of Search ............... 588/200, 219, 227, 243; 422/186, 186.21, 186.25, 186.29; 219/10.55 M; 204/157.3

[56] References Cited

U.S. PATENT DOCUMENTS

| 4,438,706 | 3/1984 | Boday et al. | 588/219 |
| 4,644,877 | 2/1987 | Barton et al. | 422/186.25 |
| 5,137,701 | 8/1992 | Mundt | 204/157.3 |

FOREIGN PATENT DOCUMENTS

| 0295083 | 12/1988 | European Pat. Off. |
| 1507895 | 4/1978 | United Kingdom |
| 1536010 | 12/1978 | United Kingdom |

Primary Examiner—John Niebling
Assistant Examiner—Cybille Delacroix-Muirheid
Attorney, Agent, or Firm—Flynn, Thiel, Boutell & Tanis

[57] ABSTRACT

The invention relates to a process for disposing of organic vapors, in particular solvent vapors, in which the organic vapors are passed through an alternating electromagnetic field where they absorb energy and are pyrolytically decomposed.

42 Claims, 5 Drawing Sheets

PROCESS AND DEVICE FOR DISPOSING OF ORGANIC VAPORS, IN PARTICULAR SOLVENT VAPORS

Field of the Invention

The invention relates to a process and a device for disposing of organic vapors, in particular of solvent vapors, and the use of the process in related fields.

Background of the Invention

During a filling of containers or tankers with volatile solvents, the air in the container, which is saturated with solvent, is removed from the container. The higher the vapor pressure at a given temperature and thus the saturation concentration of the solvent is, the more solvent is removed to the outside. Since many solvents, as for example the chlorinated hydrocarbons, are damaging to the environment and/or are poisonous, attempts are increasingly being made to capture the solvent vapors automatically exiting during the filling operation and to dispose of these in a chemical or physical manner. Catalytic combustion can be utilized, however, it requires a highly technical and structurally complicated means and does not lead to the desired result for many solvent vapors.

Summary of the Invention

Starting out from this, the basic purpose of the invention is to provide a process and a device of the above-mentioned type, with which the organic vapors can be disposed of with relatively simple physical means and can thus be rendered harmless.

The invention is based on a principle of physics that the free electrons always existing in a gaseous surrounding are oscillatorily accelerated by an electric alternating field, are deflected, by initially elastic collisions with the gas molecules, from their path and are thus slowly heated up until nonelastic dissociation and ionization collisions with the gas molecules occurs. Through ionization, further electrons are freed for the collision process so that with a sufficient energy input from the electric alternating field, a large number of dissociation collisions can quickly result. Since the dissociation energy of the higher molecular vapor molecules is less than the accompanying air molecules, it is preferred to split the organic vapor molecules. Accordingly, it is suggested by the invention that the organic vapors are guided through an electromagnetic alternating field and are there ionized and/or dissociated by energy absorption (electromagnetic pyrolysis). According to the invention, the organic vapors are subjected to a standing electromagnetic wave and are ionized in same and/or dissociated by energy absorption. The organic vapors are thereby transmitted preferably transversely or at an angle with respect to the direction of expansion of the standing wave in the region of a maximum amplitude of the electric field vector and are there ionized and/or dissociated.

Following the splitting process, the dissociation products are advantageously recombined forming low-molecular nontoxic end products, and/or are washed out and/or are flared off.

According to a preferred embodiment of the process of the invention, the organic vapors are mixed with a carrier gas prior to being transmitted, preferably sucked, through the electromagnetic alternating field. Air can, for example, be utilized as the carrier gas with the total pressure of the carrier gas/vapor mixture being able to be adjusted to preferably 20 to 200 mbar. However, a relatively complicated apparatus is needed to produce these reduced pressures. In order to avoid complications, it is suggested according to an advantageous embodiment of the invention that an inert gas, in particular argon (technical argon) or helium be used as the carrier gas. The total pressure of the carrier gas/vapor mixture can in this case be adjusted close to atmospheric pressure, preferably to 0.7 to 1 bar. The partial vapor pressure should be approximately 20 to 300 mbar in this case.

The addition of carrier gas has furthermore the advantage that the gas temperature, in spite of relatively high electron temperatures, can be kept low, preferably lower than 500° C. The field strength of the electromagnetic field and the gas density are advantageously adjusted to one another such that the organic vapor molecules can be almost completely dissociated and possibly existing nitrogen molecules can be dissociated to less than 30%, preferably to less than 10%. The optimum electron temperature lies at approximately 2 to 3 eV (approximately 20,000 K. to 30,000 K.). The operating capability is of course assured in a slightly wider electron temperature range between approximately 10,000 K. to 50,000 K.

The rate of throughput of the organic vapors through the electromagnetic field can thereby be regulated according to the vapor composition and vapor concentration in the gas mixture preferably by a variable throttling of the gas flow and can thus be adjusted to the performance proffered and the desired waste gas composition.

The organic vapors are advantageously guided through an insulator pipe, preferably a quartz or ceramic pipe, extending through the electromagnetic alternating field, the outside of which pipe can, if necessary, be loaded with cooling air.

The device of the invention has in its preferred embodiment at least one metallic tubular conductor, a microwave transmitter connected to the tubular conductor, and at least one vapor pipe extending through the tubular conductor, and consisting of an insulating material at least in the area of the tubular conductor, which vapor pipe is loaded at the inlet end with the organic vapors and is connected at the outlet end to a suction pump. The vapor pipeline can be connected at the inlet end to a collecting reservoir connected to at least one vapor source through an adjustable nozzle, such vapor source being, for example, a filling point for a solvent container or for a tanker. When higher performances are demanded, it is possible to connect several vapor pipelines in groups to the collecting reservoir each extending through a tubular conductor equipped with a microwave transmitter and connected to a common suction pump. This results in a module-like structure which can be flexibly adapted to different performance demands. The vapor pipes are thereby connected advantageously at equal angular distances from one another in a parallel alignment to the collecting reservoir, while the tubular conductors, through which the vapor pipelines extend, project radially outwardly at equal angular distances from one another beyond the vapor pipeline arrangement, with the microwave transmitters being arranged on the outside and the vapor pipelines on the inside of the tubular conductor. For reasons of space it is possible to arrange the tubular conductors alternately in two different planes.

Since a portion of the microwave energy is converted into heat, the tubular conductor is according to a preferred embodiment of the invention loaded with a cooling gas, preferably cooling air. The cooling gas is fed with excess pressure advantageously near the connecting point of the microwave transmitter into the tubular conductor, while near the points of penetration of the vapor pipeline openings or perforations in the tubular conductor wall can be provided for the cooling gas exit.

The microwave transmitter is advantageously constructed as a magnetron operating at a frequency of 1 to 10 GHz, preferably at 2.4 GHz. The tubular conductor has advantageously a rectangular cross section and is preferably closed at its front facing ends. It is thus possible for a standing electromagnetic wave with an electric field aligned transversely with respect to the direction of expansion to be coupled through the microwave transmitter into the tubular conductor. The vapor pipeline extends in such a case through the tubular conductor parallel or at an angle with respect to the direction of expansion in the area of a maximum amplitude of the electric field vector. It is important that the vapor pipeline consists at least in the area extending through the tubular conductor of an insulating material, preferably of quartz or a nonconductive ceramic material.

The process of the invention is primarily utilized for the pyrolytic decomposition and disposing of organic solvent vapors. They are, among others, the following substances:

Methylene chloride, trichloroethylene, 1, 1, 1 trichloroethane, perchloroethylene, methyl acetate, ethyl acetate, butyl acetate, ethylene glycol acetate, cyclohexanone, ethylene glycol, butylene glycol, monophenyl glycol, butylene glycol acetate, dimethyl formamide, diacetone alcohol, monoethylene glycol, methanol, ethanol, butanol, xylol, petroleum, benzene, toluol, naphta solvent, methyl ethyl ketone (MEK), methyl isobutyl ketone (MIBK), methoxy propyl acetate, acetone.

Besides the solvent vapors, it is possible with the process of the invention to also dispose yet other organic gases and vapors, like fuel vapors or poison and camphor gases, or dioxin.

BRIEF DESCRIPTION OF THE DRAWINGS

The invention will be discussed in greater detail hereinafter in connection with one exemplary embodiment schematically illustrated in the drawings, in which.

DETAILED DESCRIPTION

Figure 1:
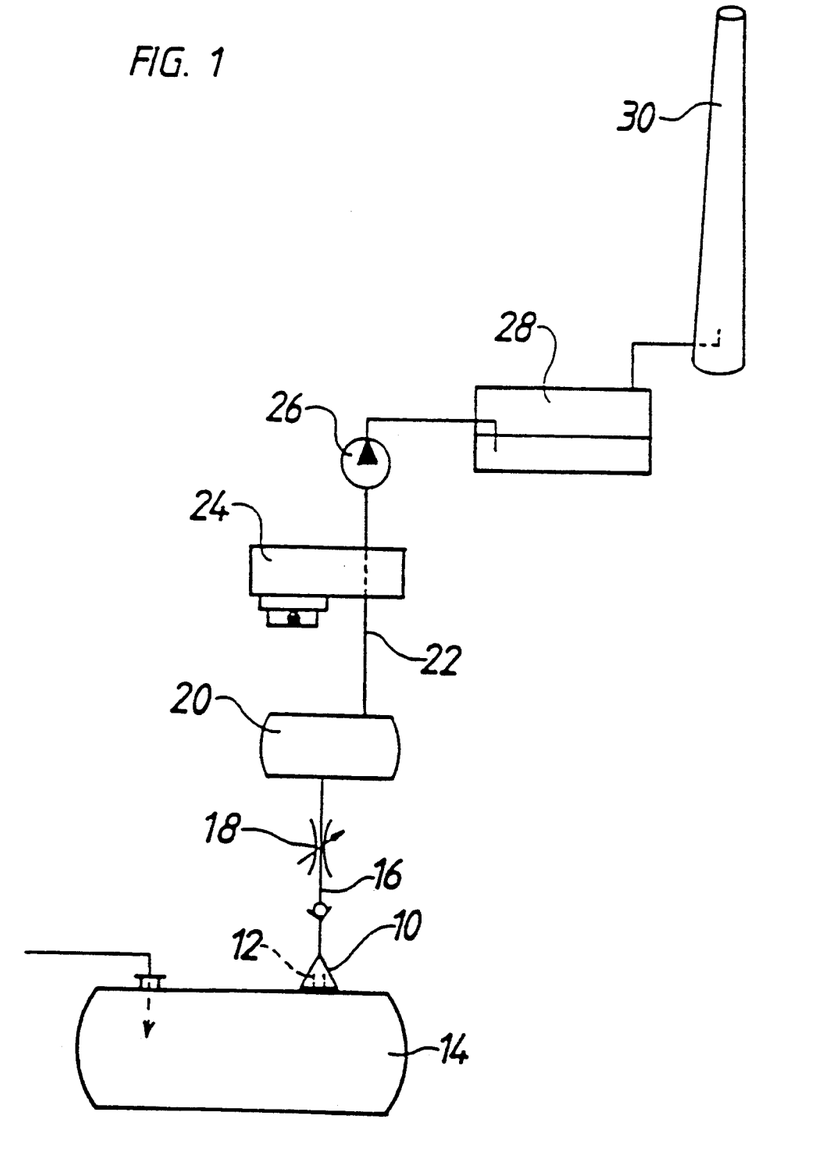
FIG. 1 is a diagram of a disposal system for solvent vapors.

The disposal system for solvent vapors schematically illustrated in FIG. 1 consists essential of a collecting device 10 for collecting solvent vapors escaping from a ventilating pipe 12 of a solvent container 14 during filling, a collecting reservoir 20 connected to the collecting device 10 through a connecting pipeline 16 and an adjustable throttle 18, at least one vapor pipe 22 branched off from the collecting reservoir lid, an electromagnetic pyrolytic cell 24, a suction pump 26 arranged downstream of the pyrolytic cell and connected to the vapor pipeline at the suction side of the pump, through which pyrolytic cell 24 extends the vapor pipe, a washer 28 connected to the pressure side of the suction pump, and a vapor stack 30 through which the arriving waste gases can, if necessary, be flared off.

Figure 2:
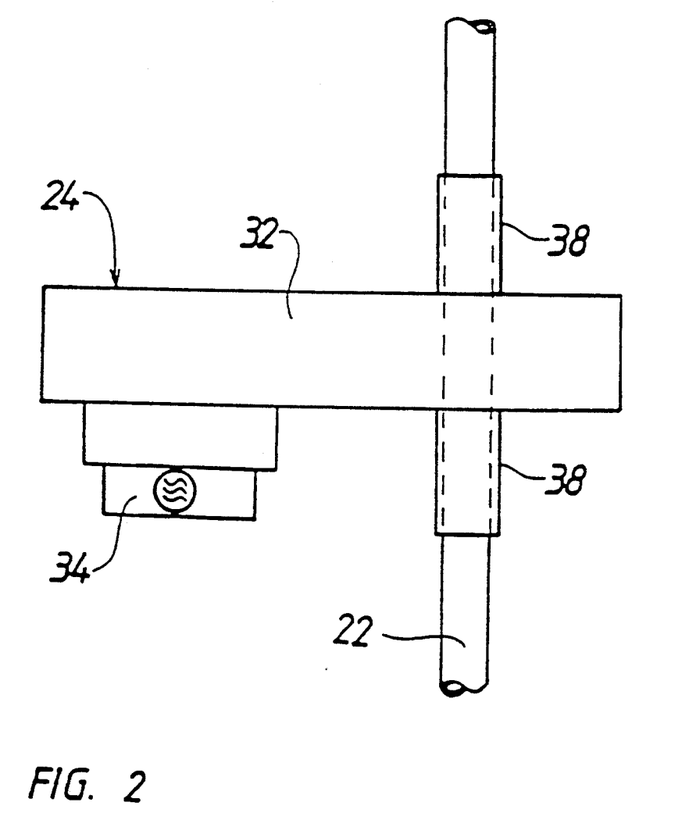
FIG. 2 is a side view of an electromagnetic pyrolytic cell.
Figure 3:
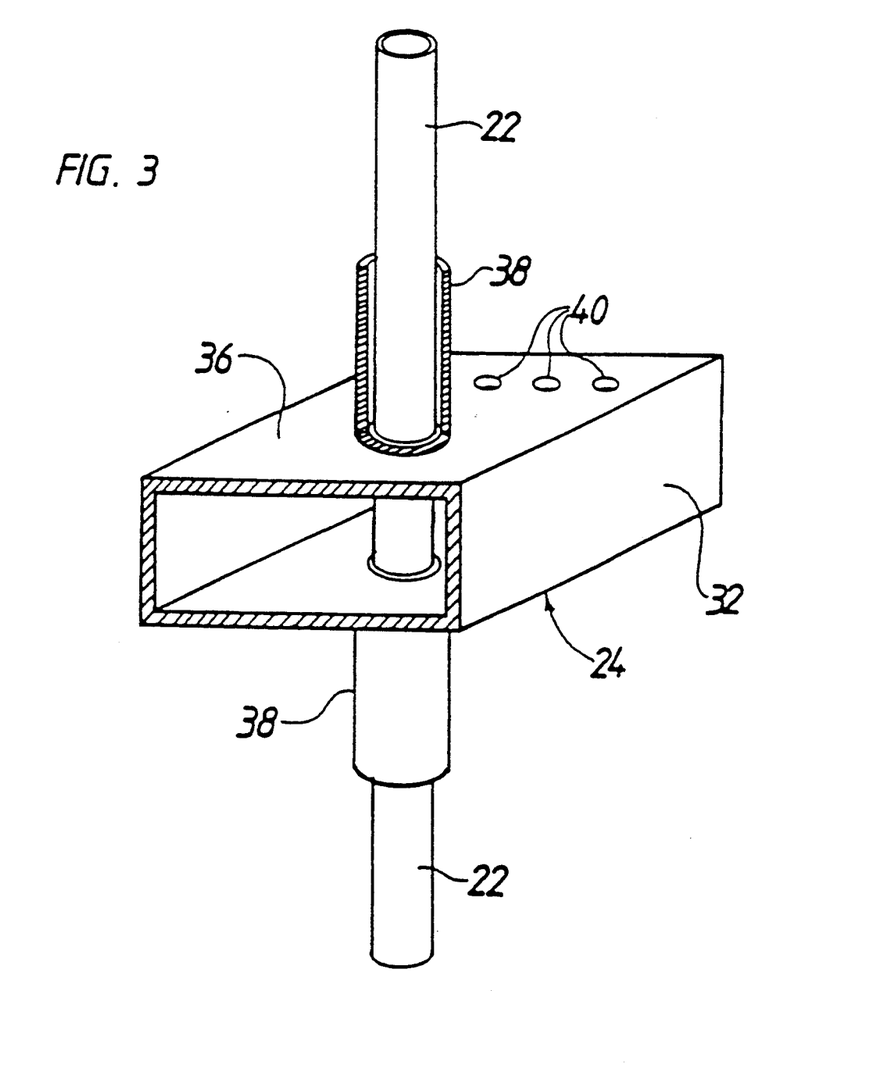
FIG. 3 is a diagrammatic cross sectional view taken along the line 3—3 of FIG. 2.

As is shown in particular in FIGS. 2 and 3, the electromagnetic pyrolytic cell 24 has at both ends a closed, metallic tubular conductor 32 rectangular in cross section, into which can be coupled through a microwave transmitter 34 designed as a magnetron a standing electromagnetic microwave having a frequency of approximately 2.4 GHz and a wavelength of approximately 12 cm. The electric field component is thereby aligned transversely with respect to the expanding direction of the microwave, perpendicular with respect to the broad side surfaces 36 of the tubular conductor. The vapor pipeline 22, consisting of a quartz glass or a nonconductive ceramic material, penetrates through the tubular conductor 32 at a location spaced from the magnetron 34 in the area of a wave crest of the electric alternating field transversely with respect to the expanding direction of the wave. Shielding pipes 38 enclose the vapor pipeline and project outwardly beyond the broad side surfaces 36 of the tubular conductor 32 at the penetration points of the vapor pipeline 22 assure that microwaves cannot exit into the exterior regions. The tubular conductor and the vapor pipeline penetrating through the tubular conductor are flooded with cooling air from the side of the magnetron. The heated cooling air can be discharged to the surrounding environment through the penetration opening for the vapor pipeline and through perforations 40 in the tubular conductor.

Figure 4:
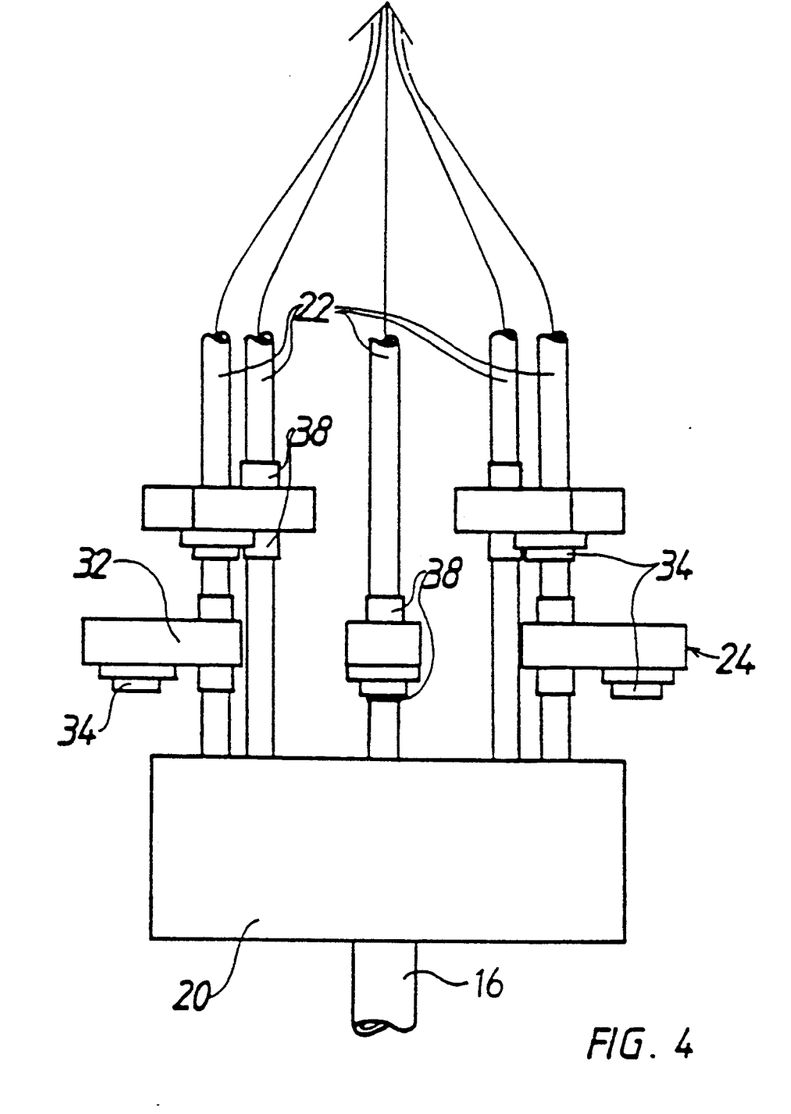
FIG. 4 is a side view of a disposing module with eight electromagnetic pyrolytic cells.
Figure 5:
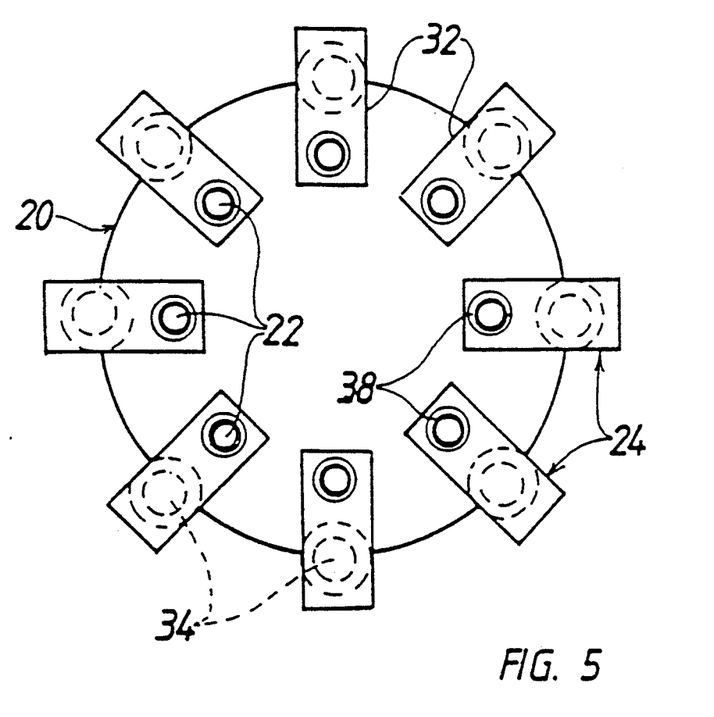
FIG. 5 is a top view of the disposing module according to FIG. 4.

The individual pyrolytic cell operates typically with a normal output of approximately 1.5 kW. In order to meet also higher output demands, several individual cells can be united into one module. Thus, a total of eight pyrolytic cells 24 exist in the exemplary embodiment illustrated in FIGS. 4 and 5, the vapor pipelines 22 of which pyrolytic cells 24 are connected to a common collecting reservoir 20 and are connected to the same suction pump. The vapor pipelines 22 extending parallel to one another are connected equidistantly from one another to the lid of the collecting reservoir 20, while the tubular conductors 32 with their transmitter portions project radially outwardly and for space reasons are arranged in two planes radially beyond the pipeline arrangement. The disposal system with eight pyrolytic cells sketched in FIGS. 4 and 5 has a total over-all efficiency of approximately 12 kW, which is sufficient for a decomposition of 10 to 15 kg of organic solvent vapor per hour, which in turn can be contained, depending on the saturation concentration, in approximately 10 to 100 $m^3$ of spent air.

The molecules dissociated in the electromagnetic pyrolytic cells recombine to molecules having a low molecular weight, like carbon monoxide, nitrogen, hydrogen, and, if necessary, some hydrocarbons, like methane, ethane and the like. Furthermore, hydrochloric acid is created during the decomposition of chlorinated hydrocarbons, which hydrochloric acid can be neutralized and washed out, for example, with sodium hydroxide in the following gas washer 28. Furthermore, the solid carbon particles created during the decomposition process are flushed out by the washer. The waste gases exiting from the washer 28 can be removed through an induction ventilator and can be flared off in the vapor stack 30.

A fill station or a ventilating pipe of a solvent container 14 or an evaporator furnace for liquid or solid waste materials can, for example, be used as the vapor source.

Exemplary Embodiment

The first tests were carried out with an electro-magnetic pyrolytic cell having a rectangular tubular conductor closed on its front side and which has the dimensions 40×80×250 mm (height, width, length) and a magnetron with a normal output of 1.5 kW and an operating frequency of 2.4 GHz/ A standing $H_{10}$-wave is produced in the tubular conductor. The vapor pipeline extends through the tubular conductor in the area of a maximum amplitude of the electric field vector.

The test are, among others, carried out with saturated solvent vapors of methylene chloride and acetone. The expected data obtained based on a mass and energy balance are as follows:

| 1. Methylene chloride Supply Data: | |
|---|---|
| Methylene chloride | 1,535 g/m$^3$ |
| Air | 501 g/m$^3$ |
| Supply rate | 1.46 m$^3$/h |
| Output (microwaves) | 1.5 kW |
| Gas pressure in vapor pipeline | 100 mbar |
| Recombined initial products | |
| $N_2$ | 0.53 gmol/min |
| $O_2$ | 0 gmol/min |
| CO | 0.28 gmol/min |
| $CO_2$ | 0.0002 gmol/min |
| HCL | 0.74 gmol/min |
| $H_2$ | 0.73 gmol/min |
| $H_2O$ | 0.0006 gmol/min |
| C (solid) | 5.5 g/min |
| 2. Acetone Supply Data | |
| Acetone | 750 g/m$^3$ |
| Air | 1,341 g/m$^3$ |
| Supply rate | 1.07 m$^3$/h |
| Output (microwaves) | 1.5 kW |
| Gas pressure in vapor pipeline | 100 mbar |
| Recombined initial products | |
| $N_2$ | 0.63 gmol/min |
| $O_2$ | 0 gmol/min |
| CO | 0.55 gmol/min |
| $CO_2$ | 0.0012 gmol/min |
| HCL | 0 gmol/min |
| $H_2$ | 0.68 gmol/min |
| $H_2O$ | 0.0035 gmol/min |
| C (solid) | 1.48 g/min |

With the above-disclosed energy and mass flows, it is to be expected that the supplied organic solvent vapors are decomposed quantitatively while forming the disclosed initial products.

We claim:

1. A process for disposing of organic vapors, comprising the steps of guiding the organic vapors through an electromagnetic alternating field, controlling the electromagnetic alternating field so that a standing wave pattern extends transversely or at an angle with respect to the direction of expansion in the area of a maximum amplitude of the electric field vector causing the organic vapors passing therethrough to be ionized and/or dissociated thereat.

2. The process according to claim 1, wherein the dissociation products are recombined and/or washed out forming low-molecular waste gases.

3. The process according to claim 2, wherein the combustible parts of the waste gases can be flared off.

4. The process according to claim 1, wherein the organic vapors are mixed with a carrier gas prior to being guided through the electric alternating field.

5. The process according to claim 4, wherein air is used as the carrier gas.

6. The process according to claim 4, wherein the total pressure of the carrier gas/vapor mixture is 20 to 200 mbar.

7. The process according to claim 4, wherein an inert gas is used as the carrier gas.

8. The process according to claim 7, wherein the total pressure of the carrier gas/vapor mixture is 0.7 to 1.2 bar, and corresponds approximately with the atmospheric pressure.

9. The process according to claim 7, wherein the partial vapor pressure is 20 to 300 mbar.

10. The process according to claim 7, wherein said inert gas is at least one of argon and helium.

11. The process according to claim 1, wherein the gas temperature of the organic vapors or of the carrier gas/vapor mixture is less than 500° C.

12. The process according to claim 1, wherein the field strength of the electromagnetic alternating field and the gas density are adjusted to one another such that the electron temperature is in the range of 10,000 K. to 50,000 K.

13. The process according to claim 12, wherein said range is 20,000 K. to 30,000 K.

14. The process according to claim 1, wherein the field strength of the electromagnetic alternating field and the gas density are adjusted to one another such that the existing organic vapor molecules are almost completely dissociated and the possibly existing nitrogen molecules are at less than 30%.

15. The process according to claim 12, wherein said organic vapor molecules are at less than 10%.

16. The process according to claim 1, wherein the rate of throughput of the organic vapors through the electromagnetic field is regulated in accordance with its composition and concentration in the gas mixture through a variable throttling of the supplied vapor flow.

17. The process according to claim 1, wherein the organic vapors are guided through an insulator pipe extending through the electromagnetic alternating field.

18. The process according to claim 17, wherein the insulator pipe is loaded with cooling air.

19. The device according to claim 14, including a mixing station arranged in front of the pyrolytic cell in the vapor pipeline for mixing the organic vapors with at least one of argon and helium.

20. The process according to claim 17, wherein said insulator pipe is at least one of a quartz and a ceramic pipe.

21. The process according to claim 1, wherein the organic vapors to be disposed are sucked off during filling of fluid containers.

22. The process according to claim 1, wherein the organic vapors to be disposed of are freed by heating of fluidy or solid waste materials and are sucked off from there.

23. A process according to claim 1, wherein at least one of the following are pyrolytically decomposed;

organic solvent and fuel vapors, poison and fighter gases.

24. A process according to claim 1, wherein one or several of the following organic vapors are pyrolytically decomposed: Methylene chloride, trichloroethylene, 1, 1, 1-trichloroethane, perchloroethylene, methyl acetate, ethyl acetate, butyl acetate, ethylene glycol acetate, cyclohexanone, ethylene glycol, butylene glycol, monophenyl glycol, butylene glycol acetate, dimethyl formamide, diacetone alcohol, monetheylene glycol, methanol, ethanol, butanol, xylol, petroleum, benzene, toluol, naphta solvent, methyl ethyl ketone (MEK), methyl isobutyl ketone (MIBK), methoxy propyl acetate and acetone.

25. A device for disposing of organic vapors with at least one electromagnetic pyrolytic cell, comprising a metallic tubular conductor, a microwave transmitter connected to the tubular conductor, and at least one vapor pipeline extending through the tubular conductor, which vapor pipeline can be loaded at the inlet end with the organic vapors, wherein into the tubular conductor is coupled a standing electromagnetic wave from the microwave transmitter with an electric field vector aligned transversely with respect to the direction of expansion, and wherein the vapor pipeline, which at least in the region of the tubular conductor consists of an insulating material, extends through the tubular conductor transversely or at an angle with respect to the direction of expansion of the wave in the area of a maximum amplitude of the electric field vector.

26. The device according to claim 25, wherein the vapor pipeline is connected to a suction pump at the outlet end.

27. The device according to claim 26, wherein the suction pump is connected on the pressure side to a waste gas washer, in particular a HCl washer.

28. The device according to claim 25, wherein the vapor pipeline is connected to a collecting reservoir at the inlet end, which collecting reservoir is connected to at least one vapor source.

29. The device according to claim 28, wherein the vapor source is a filling point or a ventilating pipe of a solvent container.

30. The device according to claim 29, wherein the vapor source is an evaporation furnace for fluidy or solid waste materials.

31. The device according to claim 28, wherein said collecting reservoir is connected to said at least one vapor source through an adjustable throttle.

32. The device according to claim 25, wherein several electromagnetic pyrolytic cells are connected to the collecting reservoir.

33. The device according to claim 32, wherein the vapor pipelines of the individual pyrolytic cells are connected equidistantly from one another to the collecting reservoir.

34. The device according to claim 33, wherein the vapor pipelines extend parallel with one another beyond a boundary surface of the collecting reservoir, and wherein the tubular conductors, through which the vapor pipelines extend, project radially outwardly at equal angular distances from one another beyond the vapor pipeline arrangement.

35. The device according to claim 34, wherein the mutually adjacent tubular conductors are arranged alternately in two planes.

36. The device according to claim 25, wherein the tubular conductors can be loaded with a cooling gas.

37. The device according to claim 36, wherein the cooling gas is fed with excess pressure near the microwave transmitter into the tubular conductor.

38. The device according to claim 37, wherein the tubular conductor wall has near the vapor pipelines openings or perforations for the cooling gas exit.

39. The device according to claim 25, wherein the microwave transmitter is constructed as a magnetron.

40. The device according to claim 25, wherein the microwave transmitter has an operating frequency in the range of 1 to 10 GHz.

41. The device according to claim 25, wherein the tubular conductor has a rectangular cross section and is closed at its front-side ends.

42. The device according to claim 25, wherein the vapor pipeline consists at least in the area extending through the tubular conductor of an insulating material.

* * * * *

UNITED STATES PATENT AND TRADEMARK OFFICE
CERTIFICATE OF CORRECTION

PATENT NO. : 5 300 202
DATED : April 5, 1994
INVENTOR(S) : Helmut MOEGEL

It is certified that error appears in the above-identified patent and that said Letters Patent is hereby corrected as shown below:

Column 6, line 41; change "Claim 12" to ---Claim 14---.
           line 53; change "Claim 14" to ---Claim 25---.
Column 8, line 29; change "Claim 37" to ---Claim 36---.

Signed and Sealed this

Sixteenth Day of August, 1994

*Attest:*

BRUCE LEHMAN

*Attesting Officer*     *Commissioner of Patents and Trademarks*